United States Patent
Varman et al.

(10) Patent No.: US 9,674,344 B1
(45) Date of Patent: Jun. 6, 2017

(54) INSTANT SUPPORT AGENT CALL SETUP AND CALL CONNECTION APPLICATION

(71) Applicant: West Corporation, Omaha, NE (US)

(72) Inventors: Mahendra Varman, Omaha, NE (US); Craig A. Webster, Omaha, NE (US); Jil M. Fisher, Omaha, NE (US)

(73) Assignee: West Corporation, Omaha, NE (US)

( * ) Notice: Subject to any disclaimer, the term of this patent is extended or adjusted under 35 U.S.C. 154(b) by 469 days.

(21) Appl. No.: 14/139,043

(22) Filed: Dec. 23, 2013

Related U.S. Application Data

(60) Provisional application No. 61/755,813, filed on Jan. 23, 2013.

(51) Int. Cl.
H04M 3/42 (2006.01)

(52) U.S. Cl.
CPC .................. H04M 3/42008 (2013.01)

(58) Field of Classification Search
CPC ................................................ H04M 3/42008
See application file for complete search history.

(56) References Cited

U.S. PATENT DOCUMENTS

| | | | |
|---|---|---|---|
| 7,353,016 B2 | 4/2008 | Roundtree et al. | |
| 8,606,604 B1* | 12/2013 | Huber | G06Q 40/00 379/91.01 |
| 8,731,163 B1* | 5/2014 | Bates | H04M 15/06 379/142.06 |
| 2003/0147519 A1* | 8/2003 | Jain | H04M 3/42008 379/211.02 |
| 2004/0101123 A1* | 5/2004 | Garcia | H04M 3/42008 379/220.01 |
| 2006/0291411 A1* | 12/2006 | Varland | H04W 8/26 370/328 |
| 2009/0005014 A1* | 1/2009 | Vernick | H04M 7/003 455/414.1 |
| 2009/0046843 A1 | 2/2009 | Baciu et al. | |
| 2011/0171939 A1* | 7/2011 | Deliwala | H04M 3/4938 455/414.1 |
| 2012/0177189 A1* | 7/2012 | Chatterjee | H04M 3/42059 379/93.17 |
| 2012/0309351 A1* | 12/2012 | Dutta | G06Q 10/20 455/411 |
| 2013/0244632 A1* | 9/2013 | Spence | H04M 3/51 455/415 |
| 2013/0295889 A1* | 11/2013 | Das | H04W 4/046 455/414.1 |
| 2014/0162611 A1* | 6/2014 | Mezhibovsky | H04M 3/51 455/414.1 |
| 2014/0171034 A1* | 6/2014 | Aleksin | G06Q 30/016 455/414.1 |

* cited by examiner

*Primary Examiner* — Nathan Mitchell

(57) ABSTRACT

Receiving and processing customer support calls initiated from a mobile/wireless device via a call function or via a mobile device application may include various operations. For instance, an example method of operation may provide receiving a service request from a mobile device, requesting a temporary telephone number to be assigned to a subsequent call to be placed from the mobile device, creating a database record with an identifier of the mobile device and the temporary telephone number, transmitting the temporary telephone number to the mobile device, receiving an automated call to the temporary telephone number from the mobile device, and connecting the mobile device with a remote call recipient.

15 Claims, 9 Drawing Sheets

INSTANT SUPPORT AGENT CALL SETUP AND CALL CONNECTION APPLICATION

CROSS-REFERENCE TO RELATED APPLICATIONS

This application incorporates by reference earlier filed provisional patent application No. 61/755,813 entitled "CUSTOMER SERVICE CALL PROCESSING AND MOBILE DEVICE APPLICATION SUPPORT" filed on Jan. 23, 2013.

TECHNICAL FIELD OF THE APPLICATION

This application relates to a method and apparatus of receiving a customer service call mobile device application selection and processing the call to invoke call setup and instant connection to a call agent with corresponding call related setup and identification information.

BACKGROUND OF THE APPLICATION

Conventionally, when a subscriber of a particular service, (e.g., cable television, online account, etc.) has a problem or needs assistance managing his or her account, the user's only recourse was to dial a telephone number, be placed on hold and begin navigating a touch pad menu, such as a dual tone multi-frequency (DTMF) interface. In recent years, voice recognition or interactive voice response (IVR) systems are able to provide menu options that involve the subscriber speaking certain responses into their phone devices. The voice responses are received and processed into digital signals which are matched against certain options associated with the spoken responses.

Receiving a call, offering IVR menu options and presenting options to subscribers still requires an expensive call processing platform that is tied to customer service representatives. In recent years, mobile device applications and online services have offered users with various upgrade, support, cancellation, and other service options. When a user attempts to call a customer service center, the call may be further integrated with the user's online resources to reduce the amount of interactions requiring a live customer service representative.

In the conventional integrated services digital network (ISDN) telecommunication environment, machine-to-machine communication does have a feature of ISDN signal transfers with data. However, the carrier/provider has strict limits on the data size and the digital telephony feature cannot be extended to the mobile platform. Therefore, posting data from a mobile application to a call destination is still difficult to implement along with other mobile device call-related application functionality.

SUMMARY OF THE APPLICATION

One example embodiment of the present application may provide a method that includes receiving a service request from a mobile device via a mobile device application, requesting a temporary telephone number to be assigned to a subsequent call to be placed from the mobile device, creating a database record comprising at least an identifier of the mobile device and the temporary telephone number, transmitting the temporary telephone number to the mobile device, receiving an automated call to the temporary telephone number from the mobile device application, and connecting the mobile device with a remote call recipient.

Another example embodiment may include an apparatus that includes a receiver configured to receive a service request from a mobile device via a mobile device application, a transmitter configured to transmit a request for a temporary telephone number to be assigned to a subsequent call to be placed from the mobile device, and a processor configured to create a database record comprising at least an identifier of the mobile device and the temporary telephone number. The transmitter is further configured to transmit the temporary telephone number to the mobile device, and the receiver is configured to receive an automated call to the temporary telephone number from the mobile device application, and connect the mobile device with a remote call recipient.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
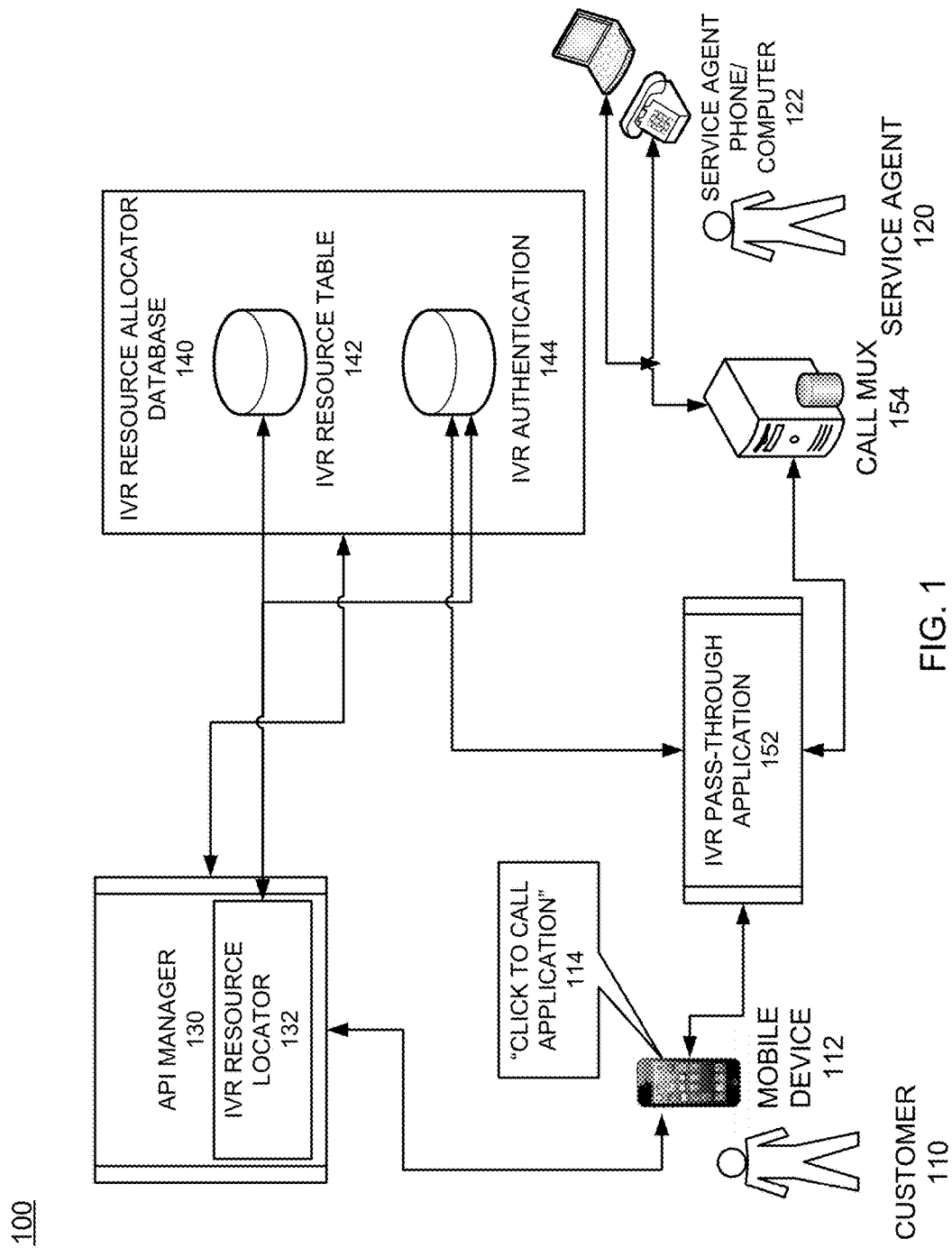
FIG. 1 illustrates a network logic system configuration according to example embodiments of the present application.

FIG. 1 illustrates an example communication network and call processing system according to example embodiments. Referring to FIG. 1, the network 100 includes a customer 110 operating a mobile device 112 and accessing a call execution application 114 ("click-to-call"), or single selection call execution to a customer service call processing center. The call may be placed by selecting a call function on the user interface which in turn may dial a "1-8YY-xxx-xxxx" ('8YY') number or other telephone number that utilizes a carrier network to route the call to the service agent 120. The call may be initially received by an interactive voice response (IVR) call processing sub-system and/or server device. Any of the "devices" may be a computer, laptop, mobile, wireless or cellular phone, a PDA, a tablet, a client a server or any device that contains a processor and/or memory, whether or not that processor or memory performs a function related to an embodiment of the application.

The 'click-to-call' (C2C) functionality 114 in the mobile application is a way that the user device 112 would contact a customer care center/agent 120 through a computer telephony integration interface (CTI) where the intermediate connect platform will provide a facility to post user data. The logic associated with synchronizing the posted data and call transfer is described in detail below. The mobile application will have the "click-to-call" functionality by initiating an API request to the connect platform or application. For example, the API manager 130 may be an accessible interface application that is operated on a call connection platform (e.g., server, router, etc.) that provides an IVR resource locator 132 to identify the caller and the needed data to route the request/call properly.

Once the API request is sent to the API manager 130, the API manager 130 may utilize the resource locator 132 to retrieve data records from the IVR resource locator database 140. The database includes an IVR resource table record database 142, which provides a requestor identification ID retrieval function and record storage of the registered devices. The database 142 may also provide an IVR resource function to assist the mobile device operator with menu selection and option navigation. The IVR authentication database 144 may provide an IVR resource as well and other needed information, such as authentication, automatic number identification (ANI) information and other data resources.

In this initial request sent from the mobile device 112 to the API manager 130, a 'ClientReferenceID' parameter may be part of the request, which is a type of authorization into The connect platform which includes the API manager 130, the IVR pass-through application 152, the IVR resource allocator 140 and the call routing server or multiplexer (MUX) 154 to obtain access to the IVR registry and corresponding service agent 120 and call recipient device 122.

The user data which is collected in the mobile application is posted to middleware of the connection platform. In the final response, the mobile application will obtain the telephone number to the IVR system. When the IVR pass-through application receives the call, the user would have been authenticated and the record would have been already created before and then matched, and data used for the integrated communication management (ICM) data posting may be used. In certain examples, the user device software development kit (SDK) may not provide access to the device's ANI. As a result, the IVR resource may be requested without access to the ANI information. In one example, a pool of 8YY numbers may be made available for assignment during the connection process.

Figure 2:
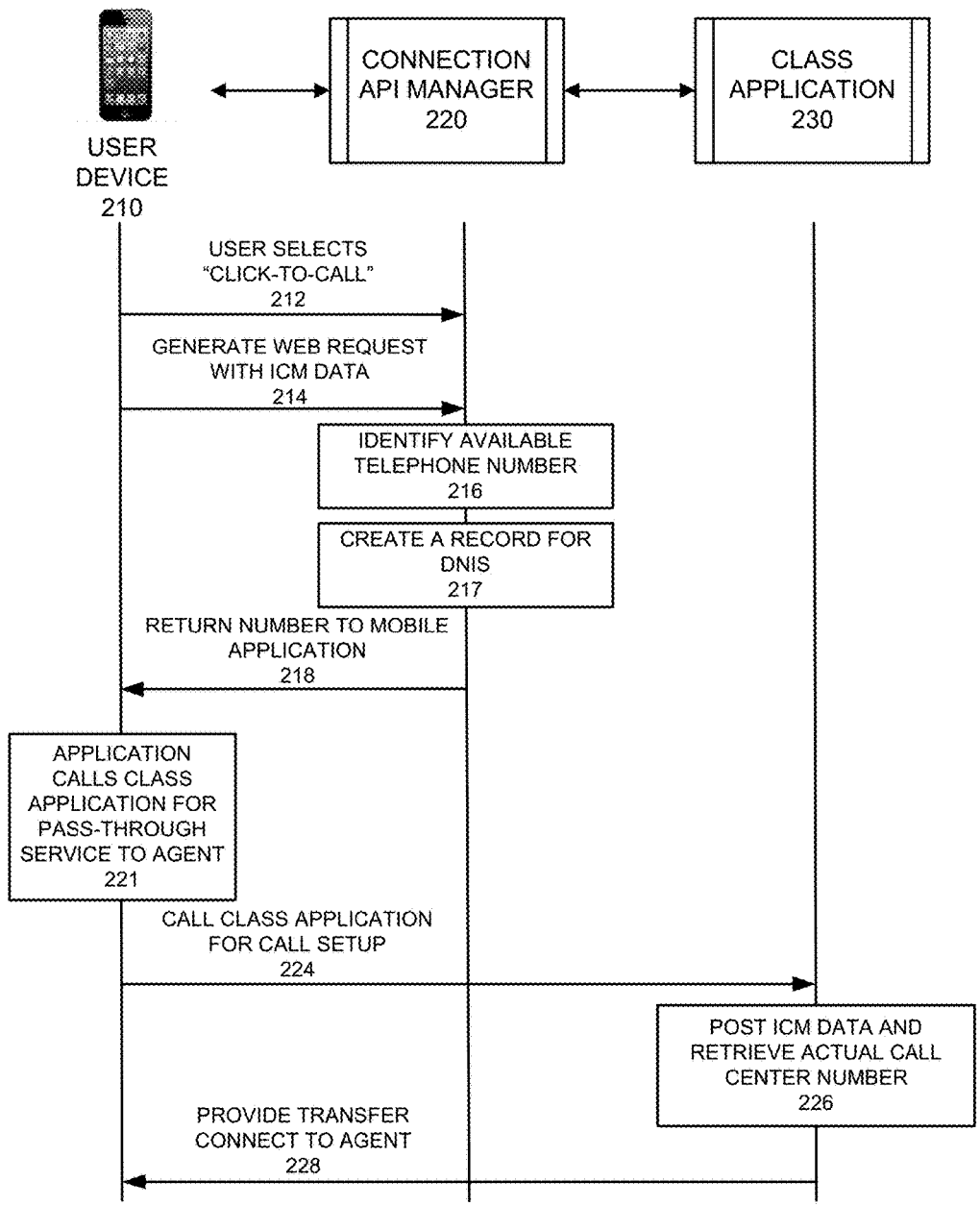
FIG. 2 illustrates a system communication diagram according to example embodiments of the present application.

Additional features and functions performed during a user device communication procedure are described in detail below with reference to FIG. 2. Referring to FIG. 2, the system communication diagram 200 includes a series of communication operations conducted among the user device 210 and the various applications and API communication interfaces used to connect the mobile application with a customer service agent operating in a call center. For example, when a user or trigger selection function selects a click-to-call application function, such as a one-click call feature 212 or related option on the mobile device application, the mobile application may create a https type request 214 with specific ICM data that is received via the API manager interface 220, which locates a telephone number which is not in use 216 from a pool of available numbers which may be temporarily assigned via a dialed number identification service (DNIS) 217 to the call center in order to route the mobile application to the call center but without creating a permanent call route. Next, a time constraint may be applied to the temporary telephone number assignment operation (e.g., 60 seconds, 90 seconds, etc.). A corresponding record may be generated and stored in memory for the duration of the assignment time constraint.

The number is then returned 218 to the application operation on the user device 210. The user device application may then be ready to communicate with the class application for the pass-through service to the agent 221. A class application 230 may be accessed and setup for a call setup 224 procedure. The class application may identify a reserved record and whether the present time is before the expiration time prior to attempting to connect the user device with the live agent. The ICM data may be posted and the actual call center number may be retrieved 226 and used to connect the user device 210 with the live agent via operation 228.

There is no specific format for the user data, which will eventually be posted to the CTI interface. Currently, it is a delimited clear text. However, it could also be in a javascript object notation format (JSON) or (XML) format. The data could have an event trigger which could be used to invoke additional functions in the IVR application before and after the CTI data post. The events that result may include a timeout, failover rule, logging rule and/or additional database lookup rule. However, the data passed to the CTI may be raw and may invoke a screen pop-up at the agent desktop device or phone 122. The event trigger may be separate from the raw data so the commands may be used in various other types of applications.

In the initial API request sent from the mobile device 112, the client may post its "client_refID" parameter that is used to identify a corresponding active record and match it to the client request so configuration settings may be applied to the application. The client operation may be deactivated to shut down the mobile access if necessary. A time-to-live (TTL) parameter may be setup to compute the expiration time of the telephone number record for the current session. Also, the available pool of telephone numbers may be allocated in various different ways. For example, a round-robin approach may be used and/or an overflow approach may be used to allocate the numbers. In the round-robin approach, every available telephone number is utilized equally. In the overflow approach, the first number in the pool position is assigned each time first prior to other numbers being assigned.

When utilizing the overflow approach, there are two parameters that must be identified, one is the maximum simultaneous requirement to determine the depth of usage and the second is the least used numbers' billing which can be negotiated depending on the usage. If a number was assigned or reserved for a long time and was not released the 'timelimit' parameter will determine when to perform a brute force channel release function to place the number back into a service pool.

The telephone number to DNIS mapping requires a channel capacity to indicate how many simultaneous allocations are allowed for a given number. This will depend on two conditions, one is the ability of the mobile API to expose the ANI and the second is the business decision to allow multiple allocations or not. The 'channel_availability' parameter identifies a number of available allocations for a particular number provided that the number is greater than '0', then that number is available for a next allocation. A reservation of the number increments the count, which is decremented, and when the call is finished the count may be incremented again. A 'usage_meter' parameter is used to keep track of how many times the given number is allocated. FIG. 3B illustrates the process of setting the 'usage_meter'.

Figure 3A:
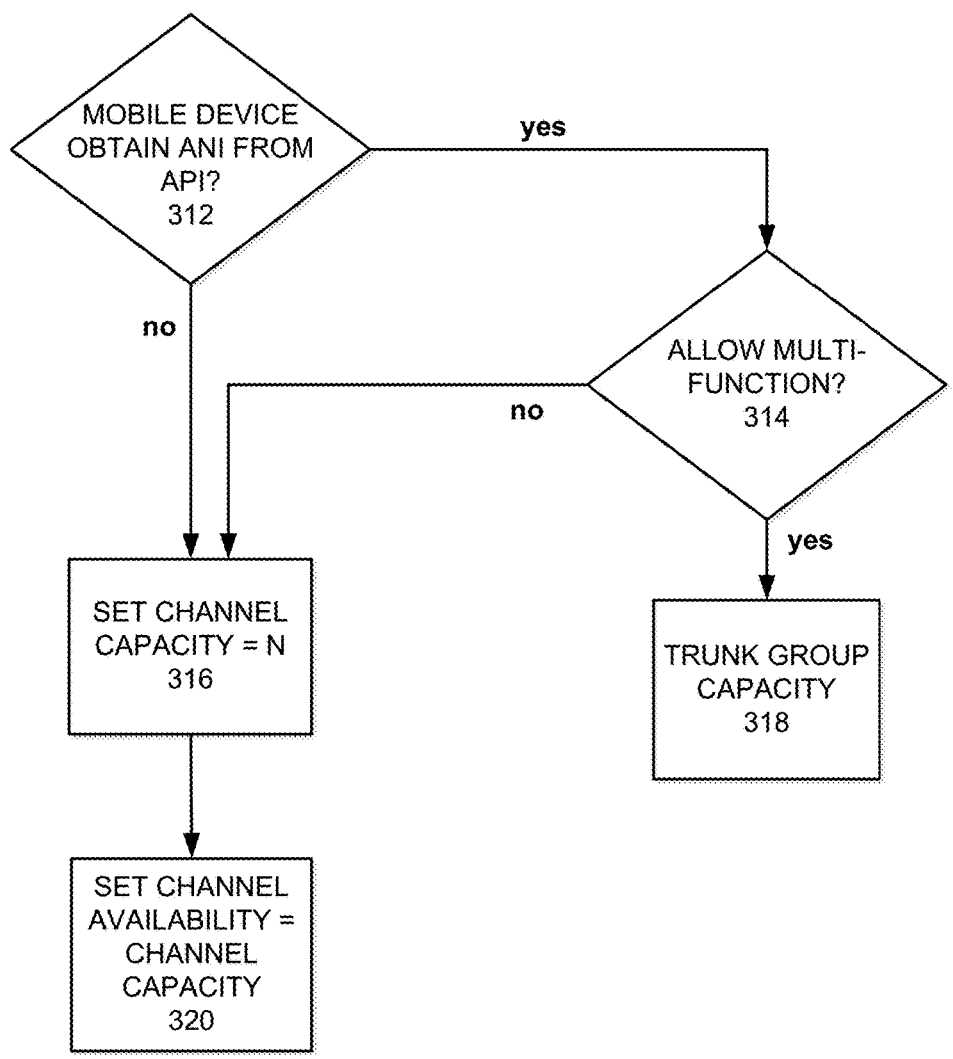
FIG. 3A illustrates an example flow diagram according to example embodiments of the present application.
Figure 3B:
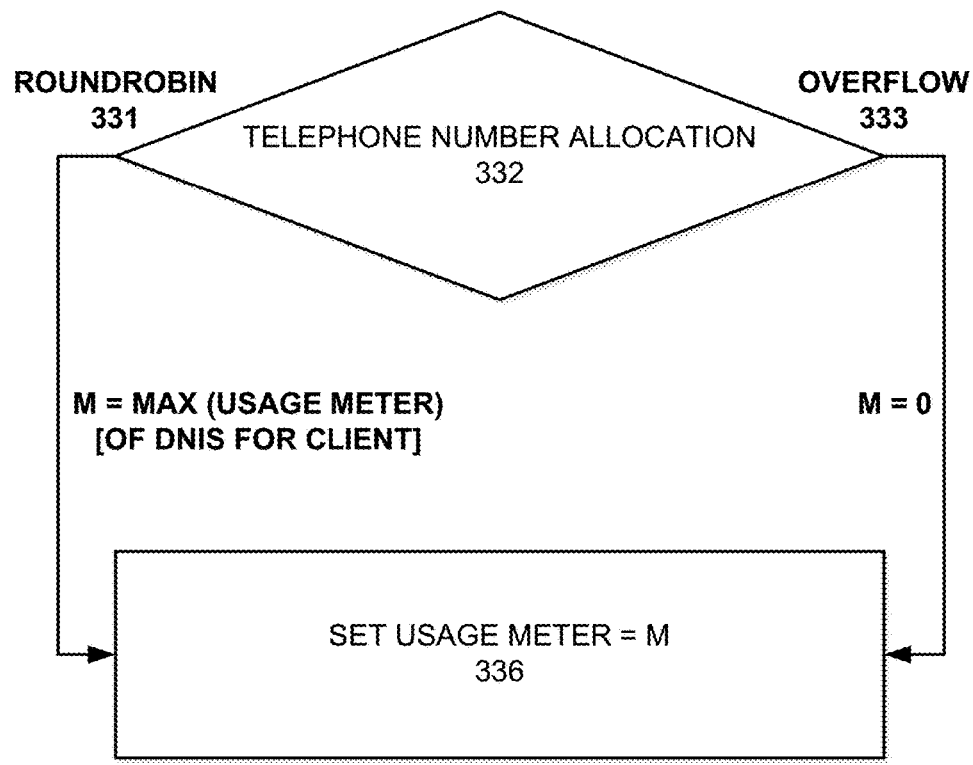
FIG. 3B illustrates another example flow diagram according to example embodiments of the present application.

FIG. 3A illustrates an example flow diagram of a procedure for setting an initial channel capacity and availability. Referring to FIG. 3A, the flow diagram 300 includes a decision as to whether the mobile device can obtain an ANI from the API 312. If so, then a business decision is made as to whether to allow multi-function use 314 and the trunk group capacity 318 is identified accordingly. The decision not to do so provides the cannel capacity to be set to N, which may be '1' and the channel_availability may be set to the channel_capacity 320.

FIG. 3B illustrates a flow diagram 330 for setting a usage meter parameter. Referring to FIG. 3B, the process includes a telephone number allocation method 332 being selected by the application and if the decision is to perform a round-robin approach 331, then the variable 'm' is set as the maximum usage_meter for the DNIS of the client or if the method is overflow 333 then the value of 'm' is 0. The usage_meter parameter is then assigned to the value of 'm' 336.

Once the telephone number is selected by the one or more options (round-robin, overflow, etc.) the application may perform an authorization identifier generation operation and create a record in the 'icm_access_registry' table to register the current available data, such as DNIS number, client ID, authorization ID, the ANI from the mobile application (e.g., the ANI is the key between the application and the IVR call), current time from the TTL before the access (seconds), the corresponding expire time, ICM data which was sent in the original API request, etc. Next, a response is created and sent back to the mobile client with the IVR's telephone number and the authorization ID.

Figure 3C:
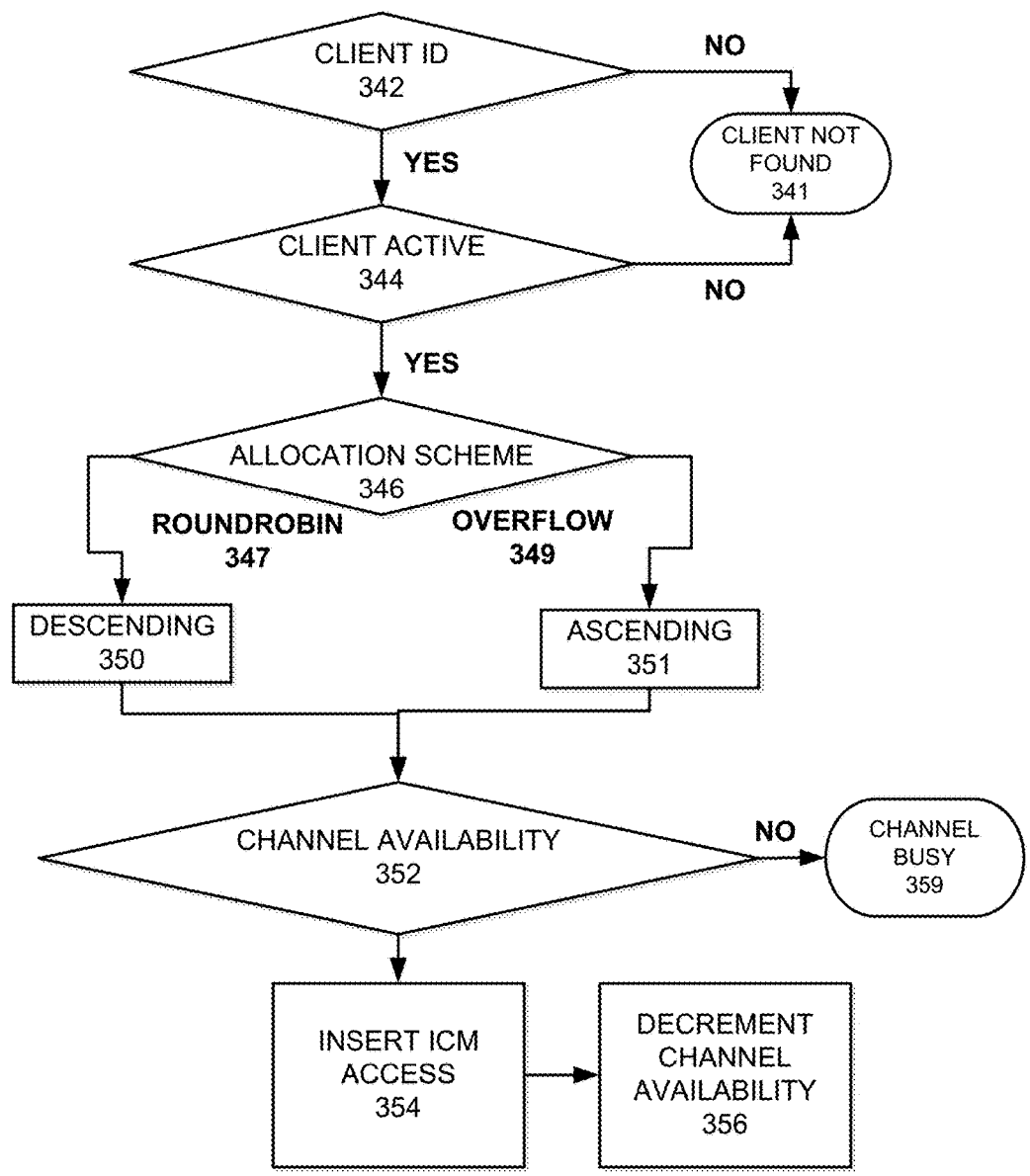
FIG. 3C illustrates yet an example flow diagram according to example embodiments of the present application.

FIG. 3C illustrates another example flow diagram of resource reservation logic and corresponding application access operations according to example embodiments. In FIG. 3C, the diagram 340 includes a client ID search function 342 and possible negative outcome 341, and a client active identification 344. Once the client is found due to a request received or other trigger operation, the allocation scheme 346 may be performed for either round-robin 347 or overflow 349. The result may be descending 350 or ascending 351 for the usage_meter parameter depending on the result of the allocation. Next, a channel availability search 352 is performed and if the channel is busy 359 then the search will fail. However, if the search is successful, then the DNIS and telephone number may be used to setup a ICM access data set that includes other data, such as a current time, TTL, client reference ID, ICM data, ANI data, authorization data, etc. The ICM access 354 may be used as the basis for the communication session and the corresponding channel availability parameter 356 may be decremented accordingly.

The 'time initiated' and the 'time expire' parameters can be used by the mobile device to re-compute and decide how long the call can be delayed or held. If the caller had to fulfill other business obligations and cannot instantiate a transfer request, then the mobile device 112 can recycle the logic or requesting another resource allocation before placing the transfer request to the IVR application.

Figure 3D:
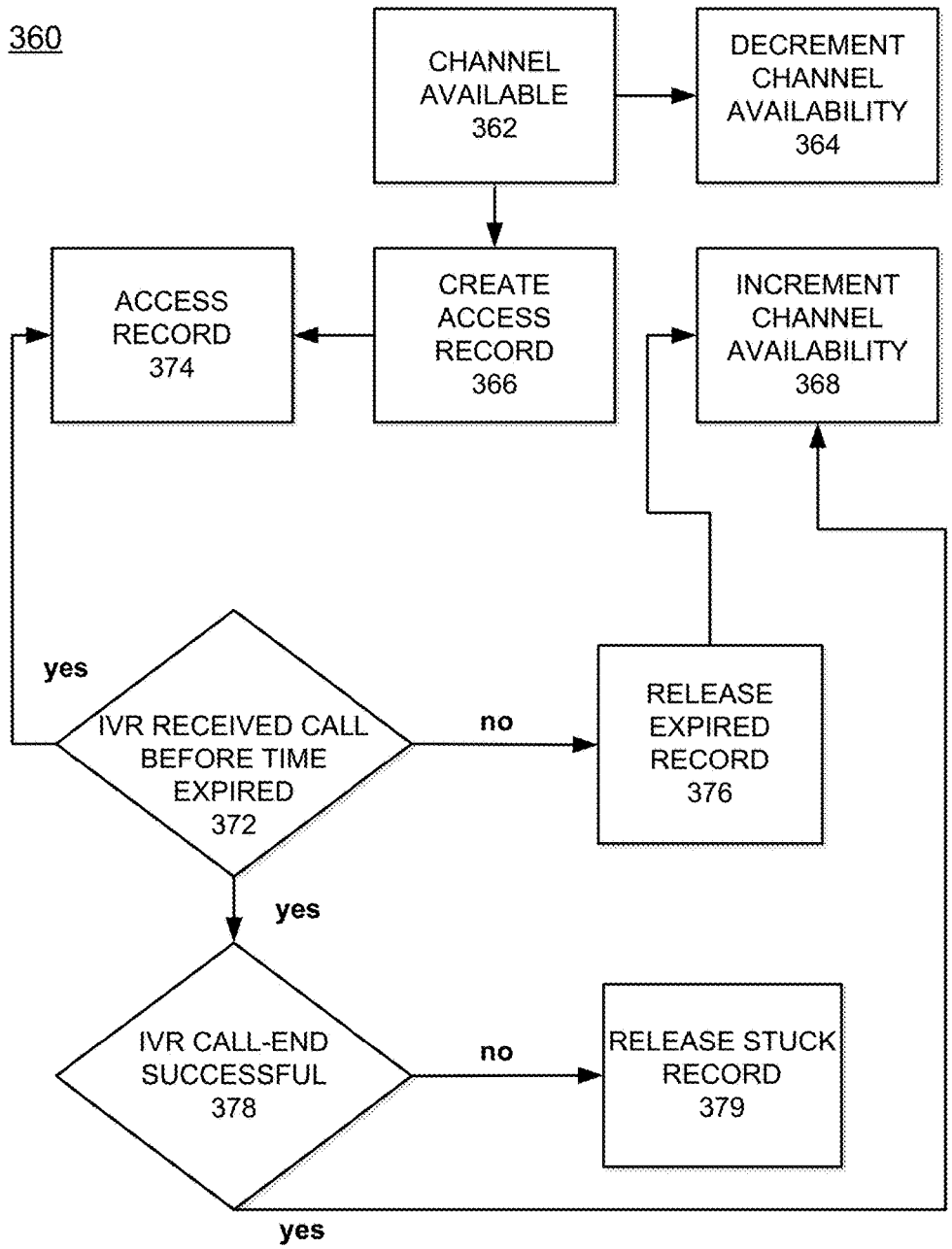
FIG. 3D illustrates still yet another example flow diagram according to example embodiments of the present application.

The ICM access record creation and subsequent access of that record along with channel availability counter arithmetic are illustrated in FIG. 3D. Referring to FIG. 3D, the flow diagram 360 includes a channel available determination 362 that leads to creating an access record 366 and decrement a channel availability identifier 364 when a number is selected. The access record may be accessed 374 when an IVR call is received before the time has expired 372, and if not then the expired record is released 376 which invokes a channel availability increment 368. The IVR call-end may be successful 378 and if so the channel is again incremented 368 or if not the stuck record can be released 379.

According to example embodiments, the process of contacting a customer care agent from the mobile application directly may also provide collecting relevant user input data, such as SMS message content, menu prompts, feedback, etc., until a decision to contact the customer care agent is triggered based on one or more of the decision criteria. Then, the mobile application will request an IVR resource allocation as a request message that passes the ICM relevant data collected. The application platform locates an assigned resource and creates a record in the database to store the ICM data, caller identification, IVR resource (DNIS), etc. The response message is created and sent to the mobile application with a telephone number to call the IVR function. The mobile application then may automatically call the IVR function. The ANI information is identified by the IVR function and this may provide unique information that will be matched with the record previously created by the application to obtain the ICM data needed for the call transfer. The combination of the DNIS, client reference ID may not be enough information to identify a unique record, and thus the ANI will be referenced to match the caller's record and obtain the ICM data.

The calls that are blocked and the ANI information that is not recognizable, the IVR application may continue with the transfer without the ICM data. The record that was created for the specific call will expire after the expiration time has elapsed and the resource will be released for subsequent usage. The IVR application may need to collect the metrics on the ANI blocked calls to determine whether a rotating DNIS logic should be applied. The telephone number obtained in the response to the API request may be used by the application to perform a transfer call to the IVR.

Figure 3E:
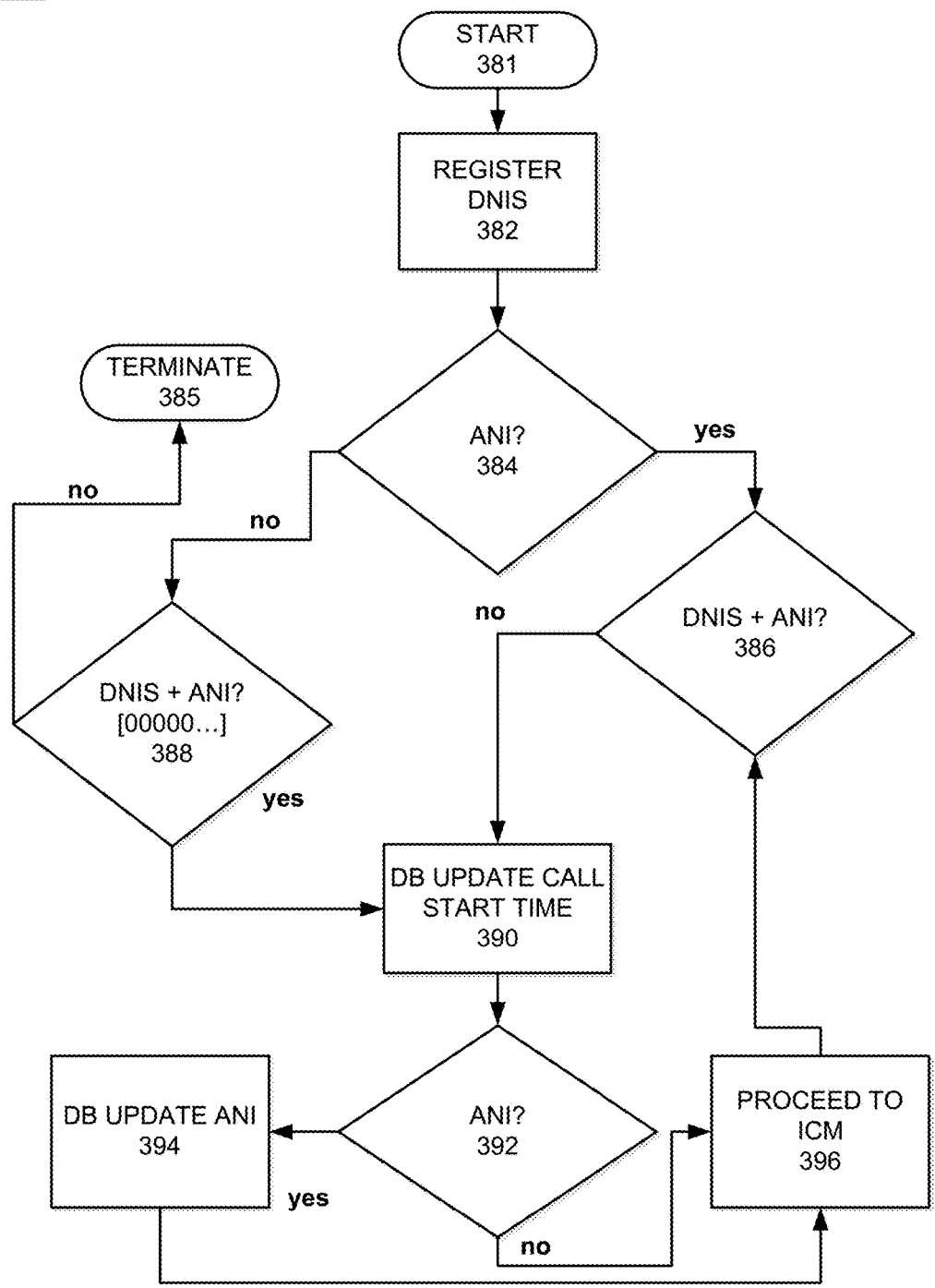
FIG. 3E illustrates still yet another example flow diagram according to example embodiments of the present application.

FIG. 3E illustrates an example of a call function IVR application logic flow diagram 380. Referring to FIG. 3E, the procedure starts 381 with a DNIS registration operation 382. The call is identified and a record is searched to determine if the ICM_ACCESS table provides a result for the call. The current time is identified and compared to an expire time. The database may be updated to make the current time the actual time accessed. The ICM data may then be retrieved from the table. The ANI is identified 384 and if it not available the DNIS is identified 388 as an alternative to the ANI and the call is terminated 385 if authorization is not determined. If so, then the database may be updated to reflect the start time 390. The DNIS and ANI may be identified 386 and the call access may proceed to the ICM 396 based on the correct ANI 392. The database may be updated accordingly with the new ANI 394.

Intelligent contact management (ICM) is a type of software application that assists the normal call progression with integration into a multimedia supported environment to present the caller context in a presentable way that can be understood by the user and accommodated by the application processing logic. One common example is the IVR application processing the calling operations and collecting information to be presented to the agent via a machine to machine communication before transferring to call to the agent. This provides the agent with an exact context of the call including its current progress.

The 8YY number pool operates and distributes 8YY numbers based on the calls received. The 8YY numbers may be stored in a data file that is referenced and marked each time a number is removed, such as "1" for busy or occupied and "0" for available. The numbers may be assigned to a particular user device as the call application requires a dial access to an agent. For example, in the conventional example, the mobile device calls the 8YY number directly (e.g., 1-800-CABLETV or 1-800-222-5388), the caller will have the ability to redial the number from the call history. According to example embodiments, it is desirable to prevent the caller from making direct calls so the call can be redirected to the call center of interest on the receiving end. Also, the agent will not have the context to converse with the caller since otherwise the data passed by the mobile device will give the exact context from a simple call operation that bypasses the application. The call center 8YY assigned number is actually different than the IVR pooled 8YY number(s). According to one example, the initial 8YY number assignment provides the mobile device with access to the middleware and on-the-fly the IVR application obtains the actual routing 8YY number based on the availability of the call center recipients through the ICM. The call center 8YY assigned number and the actual number dialed are two separate and different numbers that represent independent entities or devices. In operation, during the call with the incoming 8YY number and the corresponding data record previously posted, the IVR application determines to which ICM to submit a request. Once the matching is performed and the ICM is identified, the incoming 8YY number is released from the pool so that it available for the next mobile request submitted.

There is no specific format for the user data, which will eventually be posted to the CTI interface. Typically, different applications require different data depending on the service being offered. Since the middleware architecture does not define any specific format for the data, this permits the same universal platform to be offered across different applications. However, the IVR application will process the data and act according to its content.

According to examples of the ANI determination operations. The ANI determination(s) and storing operations are not relevant in the current call if the pooled 8YY number channel capacity is just '1'. Since the '1' indicates that the ANI may not be available and hence the given 8YY number can be utilized only by one mobile call at a given time. However, the matched ANI record can be used in a future call to match the ICM data.

The ICM data record created is identified, reference and applied to the corresponding 8YY number call. Currently, the record is reserved for 60 seconds. When the actual telephone call is received at the IVR processing platform, the record can be matched in one of various ways as illustrated in FIG. 6. An exact ANI matching operation may be performed, an exclusive reserved '1' channel for the incoming DNIS may be performed and/or a DTMF selection and recognition may be performed. In operation, the DTMF selection operation may provide that when the mobile application transmitted the initial request for channel allocation, the connection platform middleware transmits an authorization identifier ID. This ID could be of any length, but is currently coded to match a 11-digit length (including '1' for long distance) conventional telephone number. The digits are from the 16-digit DTMF matrix (i.e., 0-9, *, #, A-D). If the ANI is received in the request, the same ANI could be used as an authorization TD. When the mobile application receives the response and transmits the actual 8YY call to the IVR platform, the transmission will also transmit the authorization ID and the IVR application will recognize and match the record accordingly. The DTMF transmission may not be limited to the 16-digits and could instead be any free word and use voice recognition engine to match the record.

According to example embodiments, a user may get stuck or fail to proceed with the call processing if the user is not able to accomplish their task with the self-service IVR menu. Examples of getting stuck could include forgetting his/her account number, not understanding questions posed by the mobile application interface, not having the make/model of the service equipment in hand.

According to example embodiments, the information in the data record in the DB prior to being connecting with the IVR may be blank, however, once the "click-to-call" button is selected/pressed, the mobile application would transmit any such relevant data about the session to the call processing platform. The data could include user account number, symptoms being encountered, and where the user was at in the application menu. The DB is used to track transfer requests in progress and to map data gathered during the mobile self-service session to the subsequent incoming phone call. The platform would select an unused inbound number from the pool and return it to the mobile application. The mobile application would dial the number received. When the platform receives an inbound call to that particular number, it may recognize that it has the correct user and it can then associate the incoming call with the corresponding recording in the DB keyed by an incoming phone number. Once the record is retrieved from the database, the phone number used can be freed and returned to the number pool to be used by a subsequent caller.

According to example embodiments, the IVR may access the DP to identify or associate the incoming call with data gathered by the mobile application. In some scenarios, the caller's ANI may be used to identify the user device. A mobile application cannot access the mobile phone number (ANI) so in such cases, the mobile application will need to request the caller to enter their mobile phone number the first time they use the mobile application. Even if the user has provided their mobile number to the mobile application, it is possible that they have also disabled caller ID, so that the IVR platform will not receive their ANI. The IVR may determine that the call is a valid call by identifying each time it provides a number from the pool, so as to expect a call shortly thereafter. If the user disconnects or leaves the mobile application, the database record will have a timer that will expire and then the number may be returned to the pool and the DB record may be updated or deleted accordingly.

The agent phone number is not directly dialed by the mobile phone application. Instead, the mobile phone dials a number which forwards their call to the IVR platform. After the IVR platform retrieves the associated data, it is able to dial the call center with the number not disclosed to the caller and/or able to submit a route request to the enterprise routing system in order to transfer to the call center that has agents available just like other callers into the standard IVR application.

In one example, when the click-to-call button is selected, instead of the phone calling a phone number, the phone application accesses an IVR proxy. When the call option is pressed, a data record is sent, a phone number is received, and that phone number is dialed. On the IVR side of the connection, a data record is received, a phone number is obtained and sent, an incoming call is received, the corresponding DE record is retrieved, an enterprise route request, is made with CTI data, and the incoming call is bridged to the appropriate call center for connection to an agent. The agent device then receives an inbound call with CTI data and conducts the support call accordingly.

The outdialer is an application that accepts requests and passes those requests onto an IVR application which executes a specific call flow when an answer is received. Example embodiments provide the ability to connect the user of a mobile application with an agent without reveling the phone number to get to that agent directly. Also, the ability to connect the user of a mobile application with an agent and include CTI data about what the user was saying or performing in the mobile application. The agent would not have to ask the caller for data fields the caller had already entered in the mobile application. Additionally, the application provides the ability to connect the user of a mobile application with the best agent by being able to utilize the same enterprise routing infrastructure used by the IVR application.

Figure 4:
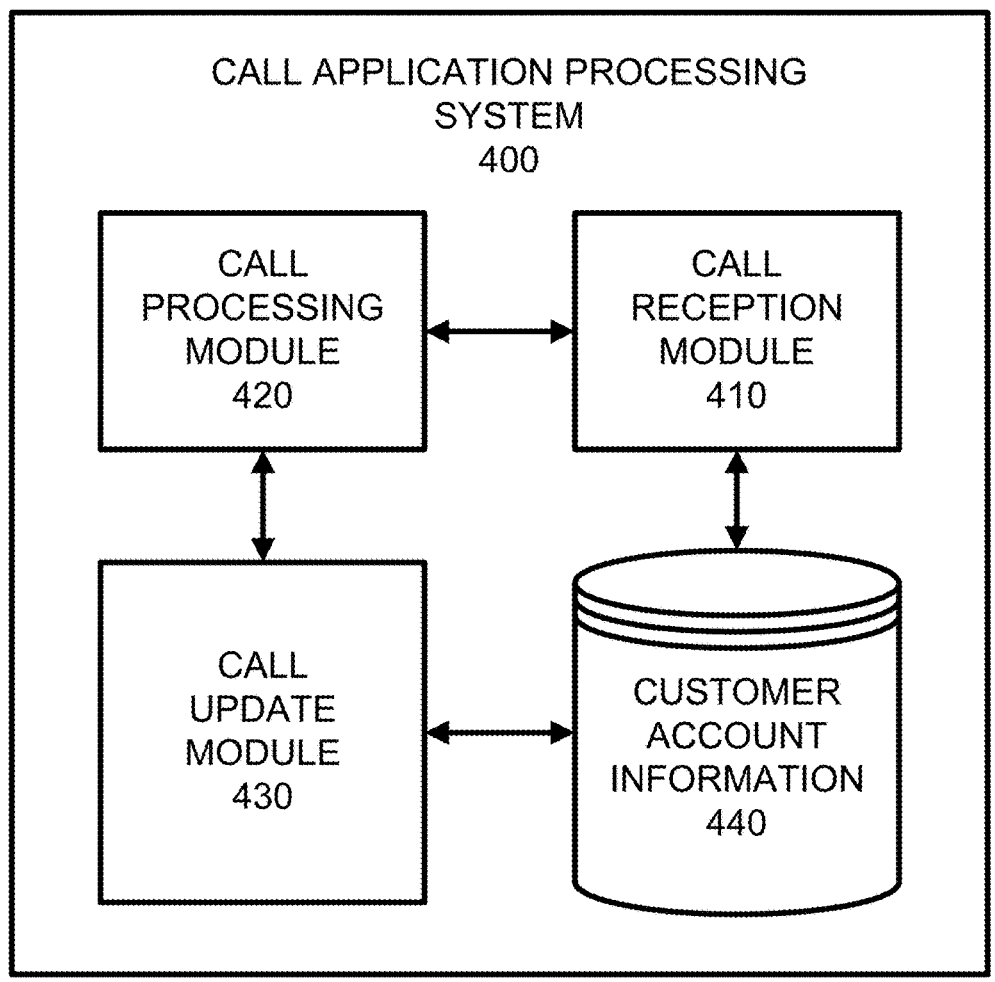
FIG. 4 illustrates a system configuration that is configured to perform one or more operations corresponding to the example embodiments.

FIG. 4 illustrates a call application processing system 400 according to example embodiments. Referring to FIG. 4, the method may include receiving a service request from a mobile device via a mobile device application via the call application processing system 400. The call reception module 410 may identify a user's call operation by a dial operation of dialing a 1-8YY number to a particular service provider or by a user initiated application access operation. The reception module 410 may begin the process by asking for information and returning results to the user interface of the application until a junction point where the application decides to dial an agent for live interaction or at least IVR menu options that can be presented to the user. The call processing module 420 may be used to identify when to dial an agent. The agent dialing operation may proceed by requesting a temporary telephone number to be assigned to a subsequent call to be placed from the mobile device. The module 420 may also create a database record in database 440 that includes an identifier of the mobile device and the temporary telephone number once that is received from the telephone number pool. The temporary telephone number may then be transmitted to the mobile device and an automated call to the temporary telephone number may be placed from the mobile device application. The mobile device may then be connected with a remote call recipient via the all update module 430.

According to other example operations, the request may be identified as a customer service support inquiry, and the remote call recipient may be identified as a customer service agent. The call may then be automatically initiated from a customer service support application operated on the mobile device which may be the same as the original application accessed by the user of the mobile device. The update module 430 may then generate a hyper-text transfer protocol secure (HTTPS) request that includes user credential information to authorize the user device. The database record further includes a time duration that the temporary telephone number is permitted to be used for call placement. Upon expiration of the time duration, the temporary telephone number is released and is reassigned to a telephone number pool stored in database 440 that includes a number of different telephone numbers. In another example, upon connecting the call to the remote calling recipient, the temporary telephone number may be released from the present call and reassigned to the telephone number pool as indicated above.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of the other figures, etc.

Figure 5:
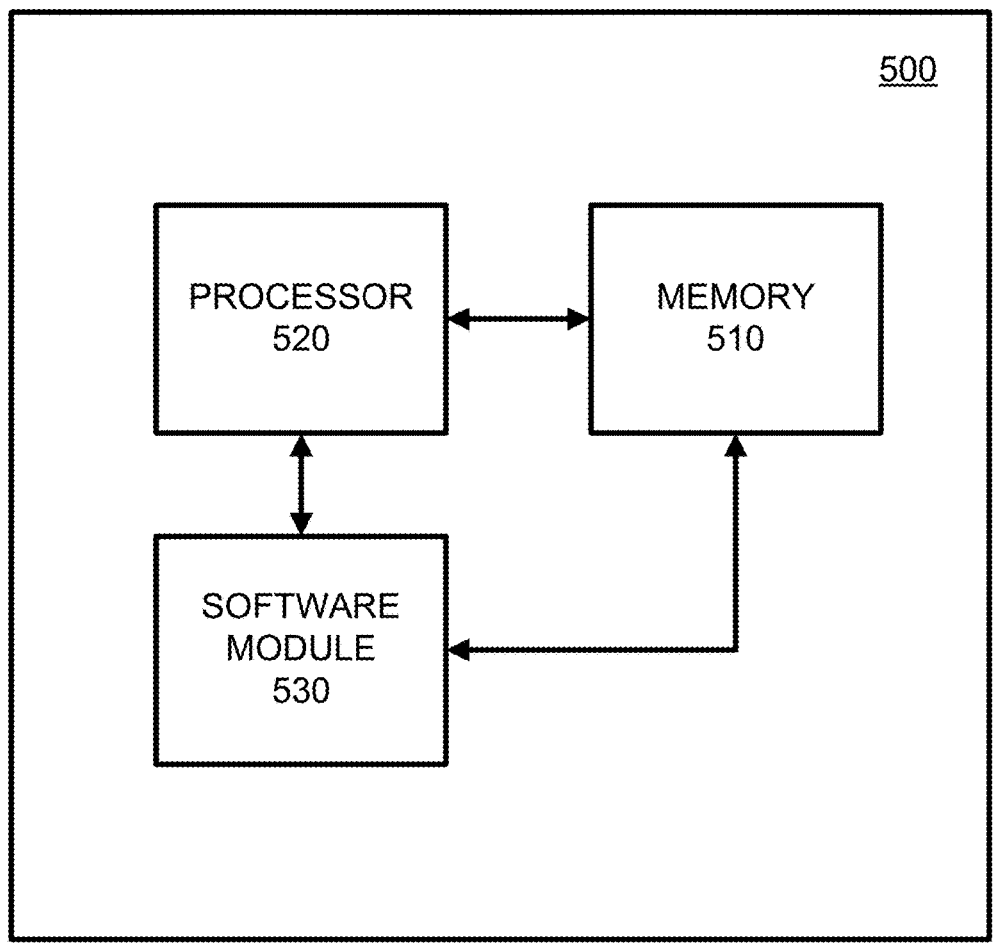
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a service request from a mobile device via a mobile device application;
   requesting a temporary telephone number to be assigned to a subsequent call to be placed from the mobile device, wherein the temporary telephone number is assigned utilizing a round-robin or overflow approach;
   creating a database record, established over a hyper-text transfer protocol secure (HTTPS) connection, comprising at least an identifier of the mobile device and the temporary telephone number, wherein the database record further comprises a time duration that the temporary telephone number is permitted to be used for call placement and upon expiration of the time duration the database record is updated or deleted accordingly;
   transmitting the temporary telephone number to the mobile device;
   receiving an automated call to the temporary telephone number from the mobile device application; and
   connecting the mobile device with a remote call recipient.

2. The method of claim 1, further comprising:
   identifying the request as a customer service support inquiry, and wherein the remote call recipient is a customer service agent.

3. The method of claim 1, wherein the call is automatically initiated from a customer service support application operated on the mobile device.

4. The method of claim 1, wherein upon expiration of the time duration, the temporary telephone number is released and is reassigned to a telephone number pool comprising a plurality of telephone numbers.

5. The method of claim 1, further comprising:
   upon connecting the call to the remote calling recipient, releasing the temporary telephone number from the present call and reassigning the temporary telephone number to a telephone number pool comprising a plurality of telephone numbers.

6. An apparatus comprising:
a receiver configured to receive a service request from a mobile device via a mobile device application;
a transmitter configured to transmit a request for a temporary telephone number to be assigned to a subsequent call to be placed from the mobile device, wherein the temporary telephone numbers may be assigned utilizing a round-robin or overflow approach; and
a processor configured to create a database record, established over a hyper-text transfer protocol secure (HTTPS) connection, comprising at least an identifier of the mobile device and the temporary telephone number, wherein the database record further comprises a time duration that the temporary telephone number is permitted to be used for call placement and upon expiration of the time duration the database record is updated or deleted accordingly, and
wherein the transmitter is further configured to transmit the temporary telephone number to the mobile device, and wherein the receiver is configured to receive an automated call to the temporary telephone number from the mobile device application, and connect the mobile device with a remote call recipient.

7. The apparatus of claim 6, wherein the processor is further configured to perform identifying the request as a customer service support inquiry, and wherein the remote call recipient is a customer service agent.

8. The apparatus of claim 6, wherein the call is automatically initiated from a customer service support application operated on the mobile device.

9. The apparatus of claim 6, wherein upon expiration of the time duration, the temporary telephone number is released and is reassigned to a telephone number pool comprising a plurality of telephone numbers.

10. The apparatus of claim 6, wherein upon connecting the call to the remote calling recipient, the processor is configured to release the temporary telephone number from the present call and reassign the temporary telephone number to a telephone number pool comprising a plurality of telephone numbers.

11. A non-transitory computer readable storage medium configured to store instructions that when executed cause a processor to perform:

receiving a service request from a mobile device via a mobile device application;
requesting a temporary telephone number to be assigned to a subsequent call to be placed from the mobile device, wherein the temporary telephone numbers may be assigned utilizing a round-robin or overflow approach;
creating a database record, established over a hyper-text transfer protocol secure (HTTPS) connection, comprising at least an identifier of the mobile device and the temporary telephone number, wherein the database record further comprises a time duration that the temporary telephone number is permitted to be used for call placement and upon expiration of the time duration the database record is updated or deleted accordingly;
transmitting the temporary telephone number to the mobile device;
receiving an automated call to the temporary telephone number from the mobile device application; and
connecting the mobile device with a remote call recipient.

12. The non-transitory computer readable storage medium of claim 11, wherein the processor is further configured to perform:
identifying the request as a customer service support inquiry, and wherein the remote call recipient is a customer service agent.

13. The non-transitory computer readable storage medium of claim 11, wherein the call is automatically initiated from a customer service support application operated on the mobile device.

14. The non-transitory computer readable storage medium of claim 11, wherein upon expiration of the time duration, the temporary telephone number is released and is reassigned to a telephone number pool comprising a plurality of telephone numbers.

15. The non-transitory computer readable storage medium of claim 11, wherein the processor is further configured to perform:
upon connecting the call to the remote calling recipient, releasing the temporary telephone number from the present call and reassigning the temporary telephone number to a telephone number pool comprising a plurality of telephone numbers.

* * * * *